United States Patent [19]
Wittern et al.

[11] 3,722,475
[45] Mar. 27, 1973

[54] HUSBANDRY APPARATUS
[75] Inventors: Francis A. Wittern, Des Moines; Warren D. Woodley, Adel, both of Iowa
[73] Assignee: Fawn Engineering, Des Moines, Iowa ; by said Woodley
[22] Filed: Sept. 20, 1971
[21] Appl. No.: 181,912

[52] U.S. Cl. .................119/51.11, 119/18, 119/52 B
[51] Int. Cl. ................................................A01k 5/02
[58] Field of Search ..........119/18, 51.11, 51.5, 52 B

[56] References Cited
UNITED STATES PATENTS
2,881,733  4/1959  Young, Jr. et al. .................119/18 X
3,587,529  6/1971  Wienert et al. .......................119/51.5
3,664,302  5/1972  Wienert ...................................119/18

Primary Examiner—Hugh R. Chamblee
Attorney—Henderson & Strom

[57] ABSTRACT

An automatic apparatus for distributing feed to a receptacle in each of a battery of animal cages during one pass of a carriage unit in front of the cages, then simultaneously flushing each receptacle and distributing water into receptacles during a return pass by the carriage unit, and wherein the feed is discharged substantially directly into each receptacle.

16 Claims, 18 Drawing Figures

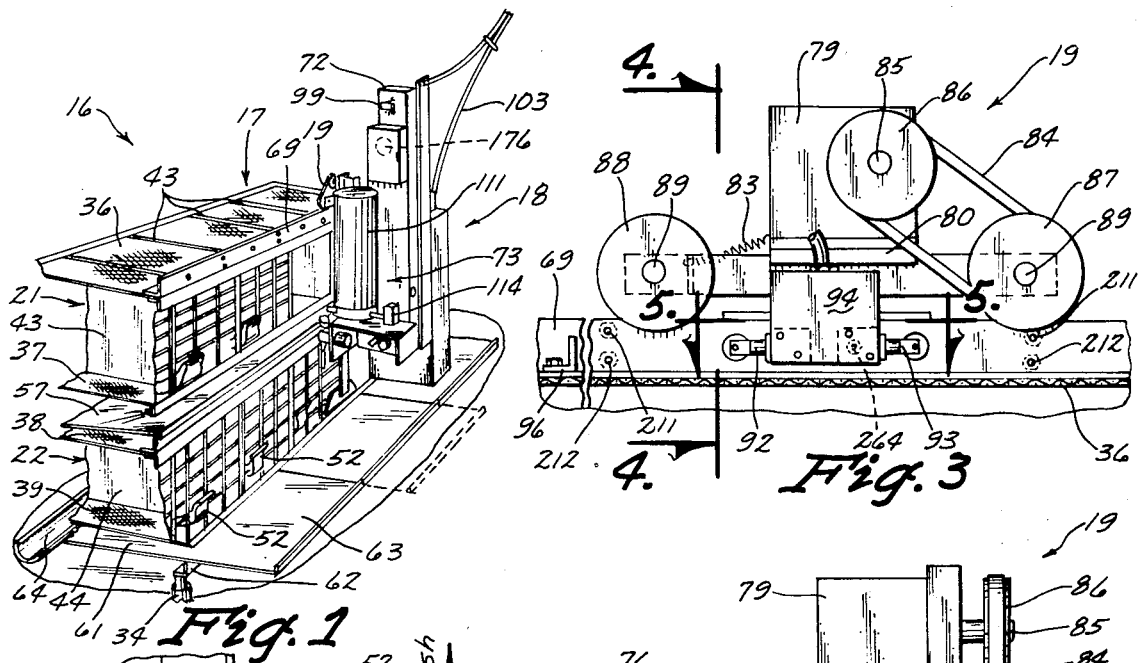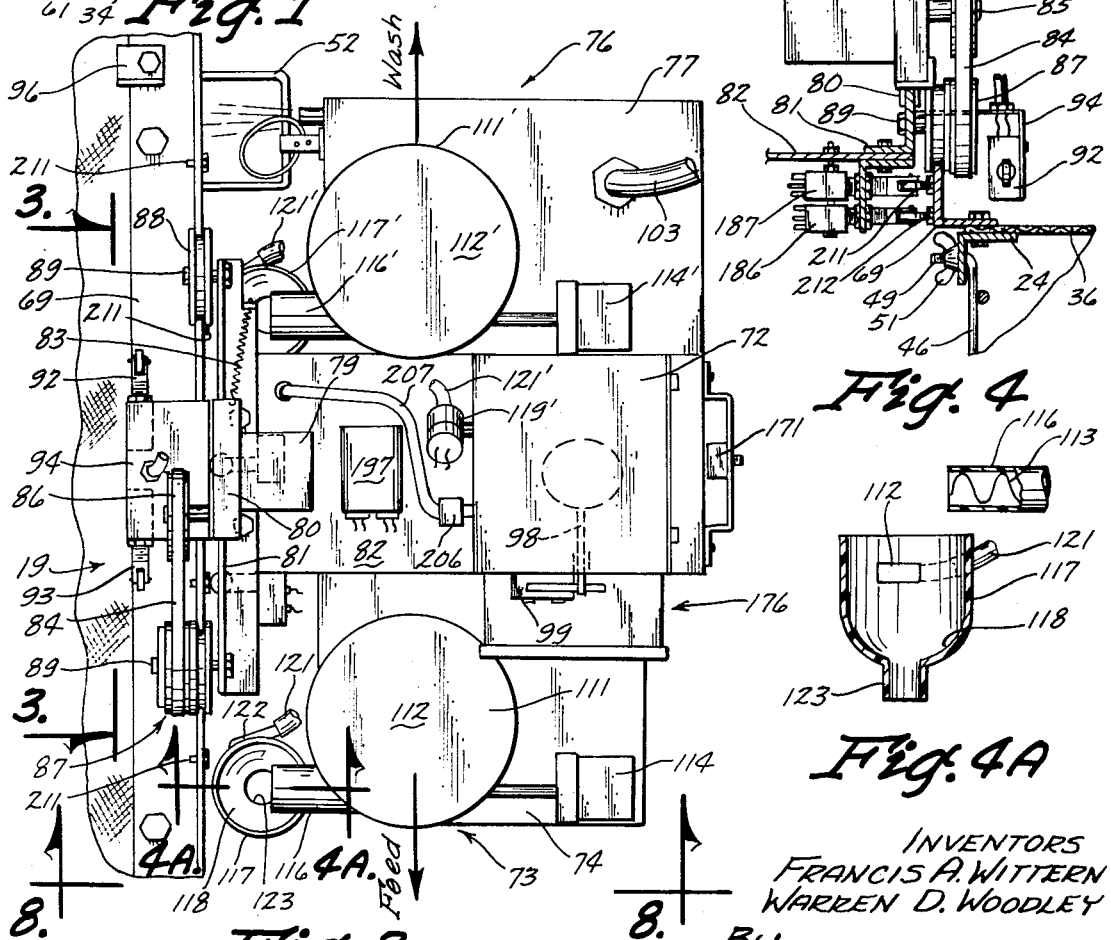

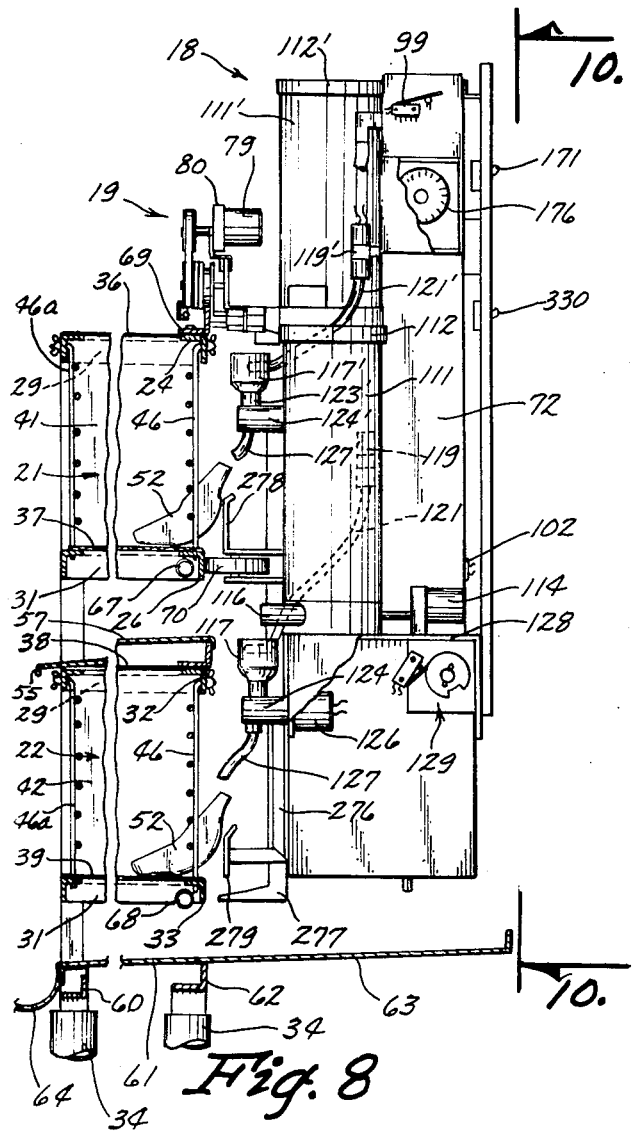
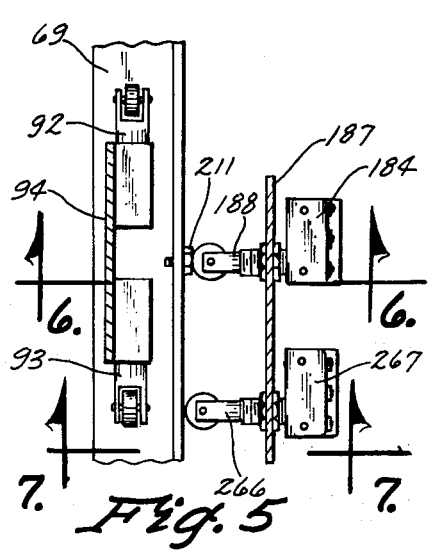
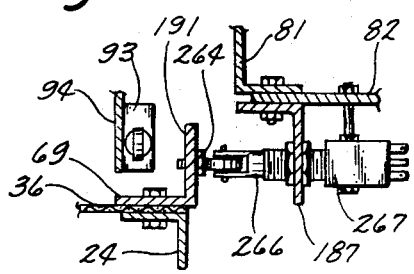
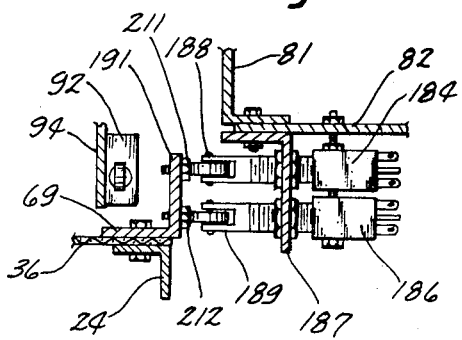
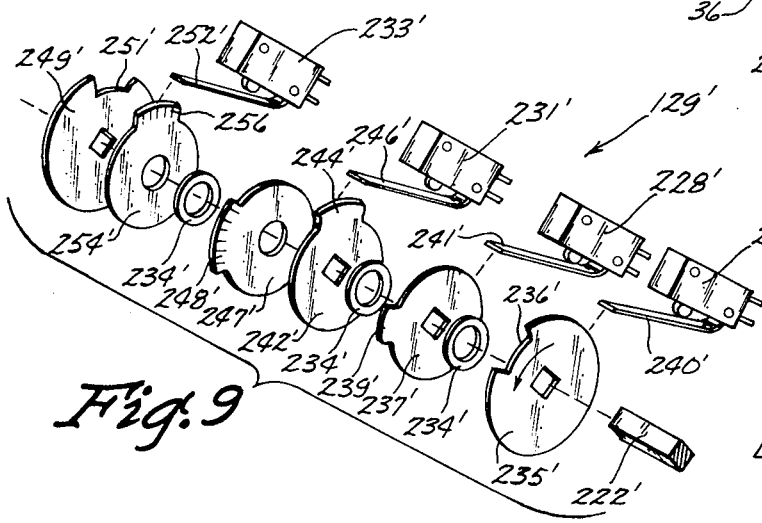
INVENTORS
FRANCIS A. WITTERN
WARREN D. WOODLEY
BY
Henderson & Strom
ATTORNEYS

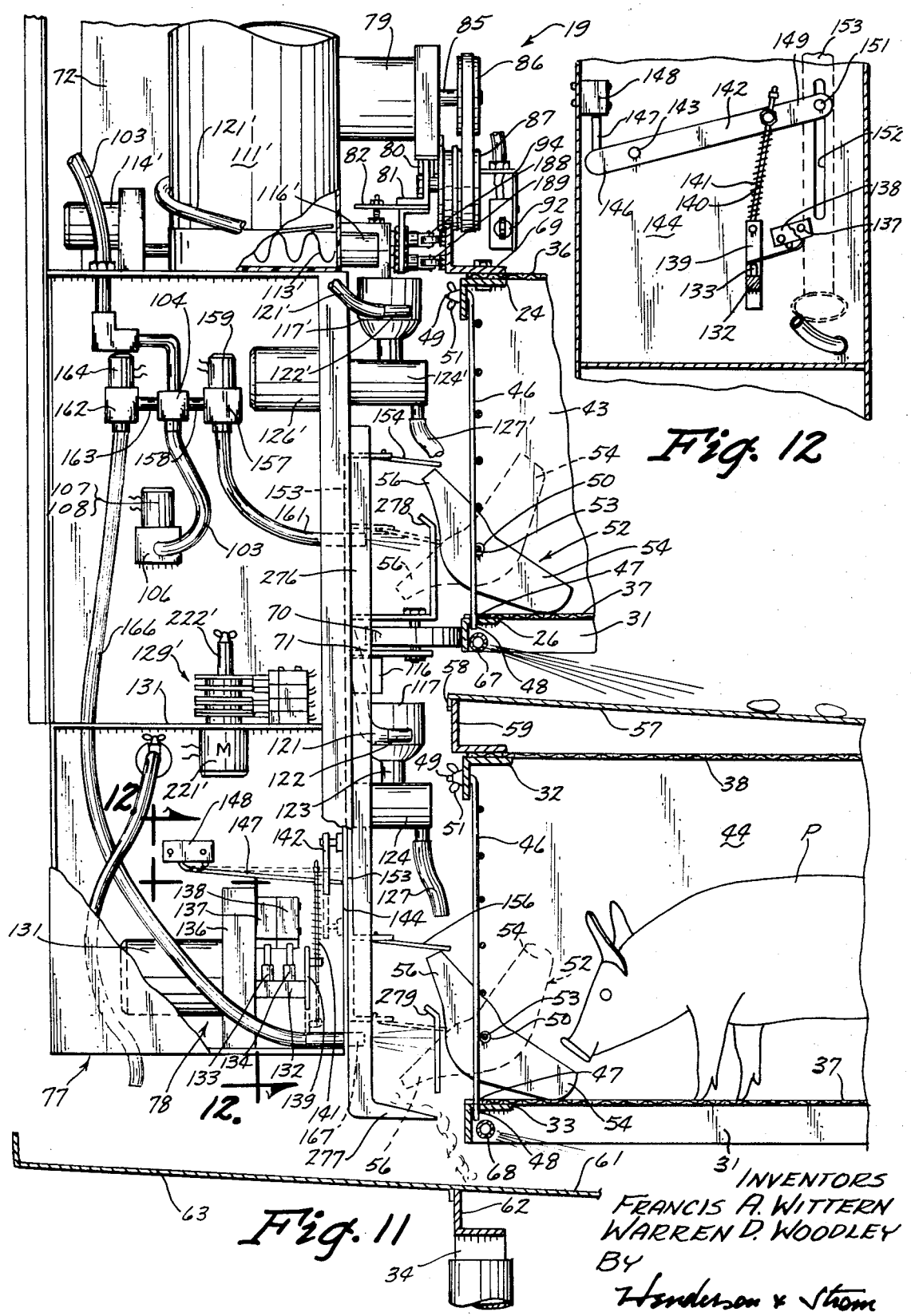

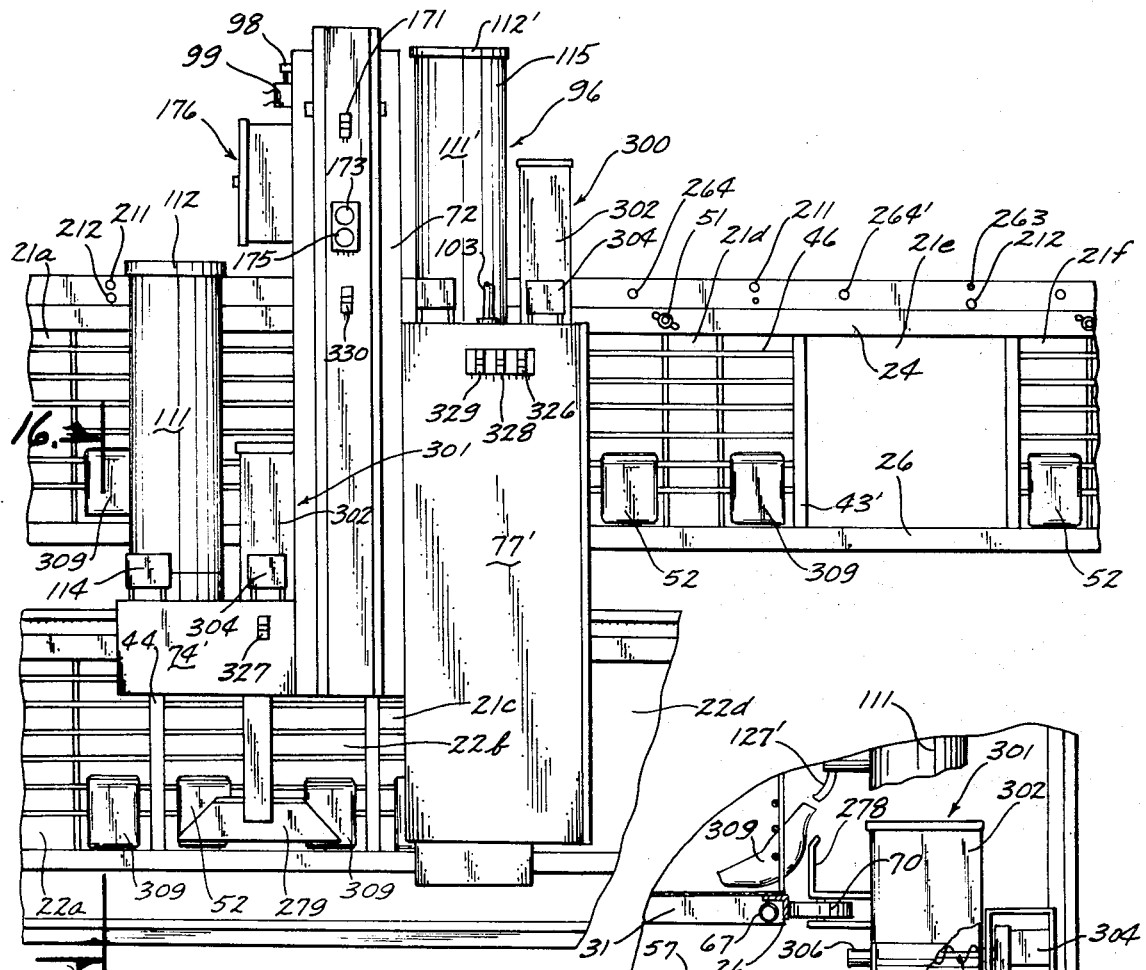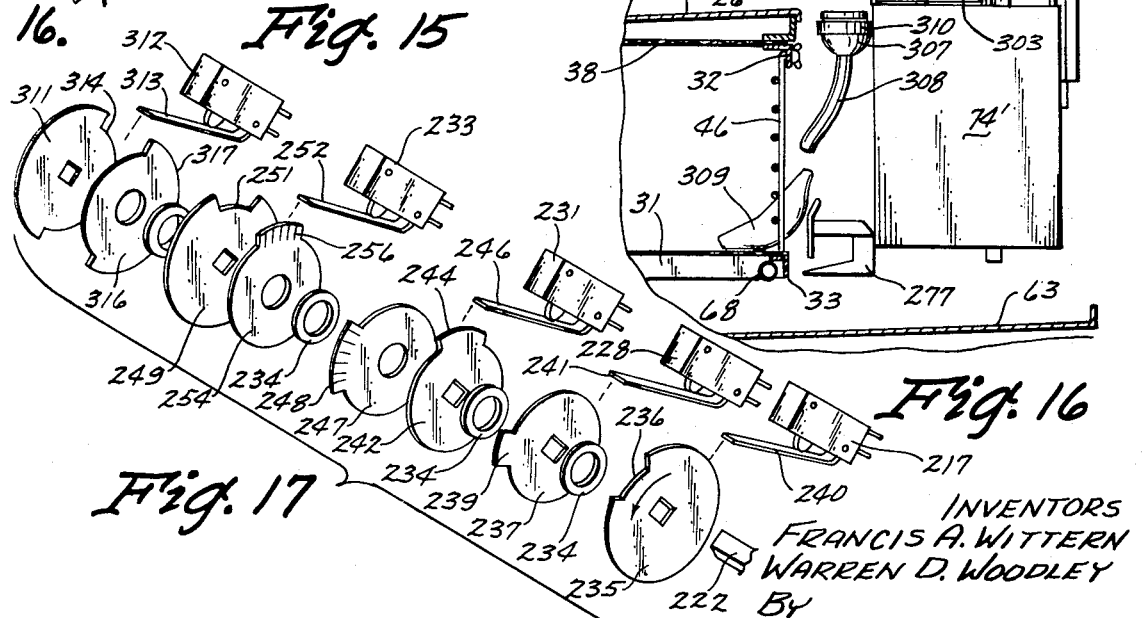

HUSBANDRY APPARATUS

BACKGROUND OF THE INVENTION

Heretofore, many units have been designed for automatically caring for animals. Several of these units include a battery of cages, sometimes of a multi-deck arrangement, across the top of which or past the face of which feed carriers move for automatically dispensing either a dry milk and water mixture, water, or feed. In some cases, depending upon whether a trough or a plurality of cup-like receptacles are provided, all three ingredients are dispensed in a variety of relationships, timed or otherwise.

These prior art arrangements have the additional disadvantages of utilizing plastic or other type tubes of one or more feet in length as they do not discharge directly into a cup, and this requires manual disassembly and cleaning of the tubes each day. They also may not mix or blend the dry milk and water prior to discharge, and not heat the water to make the mixture more nearly that of the mother's temperature.

Importantly, no contemporary apparatus of this nature flushes to clean out each cup regularly during each full pass, nor combines the flushing with dispensing water into the cup for drinking purposes. Further, no contemporary apparatus provides a regular automatic cleansing of the feed tubes and like elements.

Prior art devices otherwise generally fail to meet the needs of the industry as they are either too complicated from a construction standpoint so as to be practical, they are too flimsy and cheap of construction, they are not designed to maximize servicing particularly of the carriage and feeding units, and they fail to carry out consistently their intended operation.

SUMMARY OF THE INVENTION

The invention comprises an automatic feeder apparatus which has a plurality of animal cages arranged side-by-side in horizontal alignment to form a cage assembly, a feed receptacle or cup mounted at the front of each cage such that a portion of the cup is disposed inside the cage to be used by an animal therein and with a portion outside the cage to receive the feed, carriage means movably mounted on the cage assembly for horizontal movement back and forth in front of the cages, a canister device mounted on the carriage means for delivering a mixture of dry milk and warm water through a blending unit, and/or dry feed as the case may be, to each cup as the carriage moves in one direction, a flush device mounted on the carriage means for forcing water under pressure into each cup to clean same while leaving some water for drinking purposes as the carriage moves in an opposite direction, with the arrangement also providing for cleansing the blending unit during the opposite movement, and electric control means mounted on the cage assembly and on the carriage means for automating the entire operation such that the operator may set the control means for any desired amount and rate of feeding and flushing.

It is an object to provide an improved automatic animal feeder having a novel flushing structure, and which may be applied to multi-deck batteries of cages.

It is still another object of this invention to provide an animal feeder where the feeder cups are pivotally mounted such that in one position they may be used for feeding, and in another position they may be cleansed by being flushed with water, with some water left therein for drinking purposes.

Yet another object of this invention is to provide an animal feeder wherein the feed discharge apparatus is located so as to be moved to a position to deliver feed substantially directly into the feed cup, regardless of whether one or two tiers of cages are used.

Still another object of this invention is to provide an animal feeder wherein dry milk and warm water are mixed and blended, and a predetermined amount thereof is then delivered into each cage for the animal therein, and with a predetermined amount of dry feed delivered simultaneously or independently into each cage.

Another object of this invention is to provide an animal feeder utilizing a reversible drive motor, and with a timing mechanism capable of directing current to one side of the motor for moving the carriage in one direction to effect feeding of the animals in the cages, and capable of directing current to the other side of the motor for moving the carriage in an opposite direction to effect cleaning the feeding cups of the cages.

Still another object of this invention is the provision of an automatic animal feeder which includes a drive motor on a carriage as mentioned hereinbefore which is de-energized by a trip circuit which energizes either a feeding or a flushing circuit, and with each latter circuit including a cam-operated timing device capable of energizing the drive motor to move the carriage whereby to overcome the trip circuit.

Yet another object of this invention is the provision of an automatic animal feeder which is capable of attaining the aforementioned objectives, and which is structurally sound and designed toward animal feeding, is effective to perform its intended results, and is easily serviced for long and trouble free life.

These and other objects and features will become readily apparent to those skilled in this art upon reference to the following description when taken in conjunction with the accompanying drawings.

BRIEF DESCRIPTION OF THE DRAWINGS

FIG. 1 is a partial perspective view of a preferred embodiment of the automatic feeder apparatus of this invention;

FIG. 2 is an enlarged partial top plan view of particularly the carriage unit of the apparatus;

FIG. 3 is a view taken along the line 3—3 of FIG. 2;

FIG. 4 is a cross-sectional view taken along the line 4—4 of FIG. 3;

FIG. 4A is a cross-section view taken along the line 4A—4A of FIG. 2;

FIG. 5 is a top plan view particularly of the trip switches as taken along the line 5—5 in FIG. 3;

FIG. 6 is a cross-sectional view taken along the line 6—6 of FIG. 5;

FIG. 7 is a cross-sectional view taken along the line 7—7 of FIG. 5;

FIG. 8 is a partial view, showing the carriage unit in elevation from one side thereof, and showing a portion of the cage assembly in cross-section;

FIG. 9 is an enlarged exploded view of one of the feeding system cam timer mechanisms;

FIG. 11 is an enlarged partial view of a side of the carriage unit opposite the side of FIG. 8, and of a portion of the cage assembly cross section, taken along the line 11—11 in FIG. 10;

FIG. 12 is an elevational view of a portion of the rinse mechanism taken along the line 12—12 of FIG. 11;

FIG. 15 is an elevational view similar to FIG. 10, showing a modified embodiment of the invention;

FIG. 16 is an enlarged detail view similar to FIG. 8 and showing the modification; and FIG. 17 shows the modified cam timer mechanism in exploded view.

BRIEF DESCRIPTION OF THE PREFERRED EMBODIMENT

Figure 10:
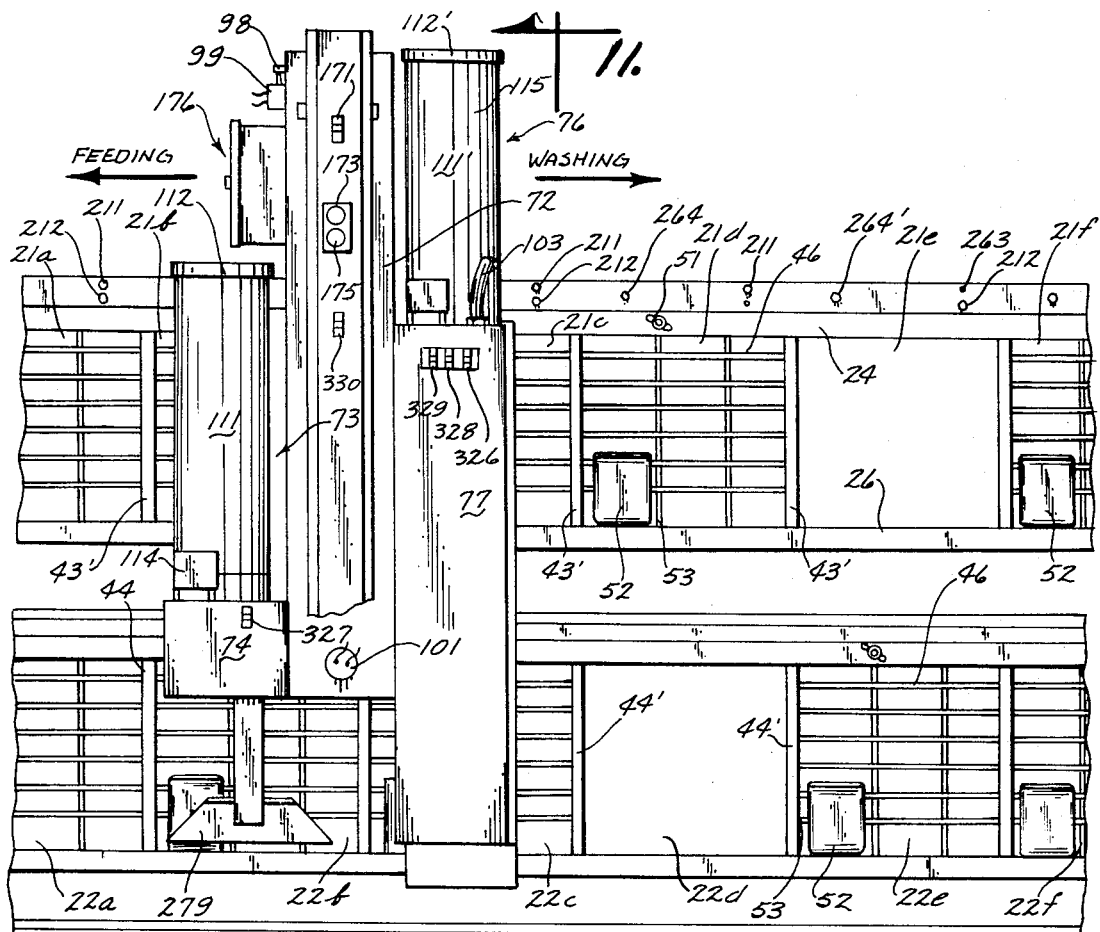
FIG. 10 is a partial front elevational view of the apparatus taken along the line 10—10 in FIG. 8.

Referring now to the drawings, a preferred embodiment of the feeder apparatus of this invention, indicated generally at 16 in FIG. 1, is illustrated. The feeder apparatus 16 comprises generally a stationary cage assembly 17 and a carriage unit 18 movably mounted on the cage assembly, and driven back and forth thereon by a driving mechanism 19. The cage assembly 17 includes an upper row of cages 21 arranged side-by-side in horizontal alignment, and a lower row of cages 22 also arranged side-by-side in horizontal alignment. The cages of each row are also vertically aligned, as for example cages 21a, 21b, 21c, 21d, 21e and 21f of the upper row are directly over, respectively, cages 22a, 22b, 22c, 22d, 22e and 22f (FIG. 10).

Figure 13:
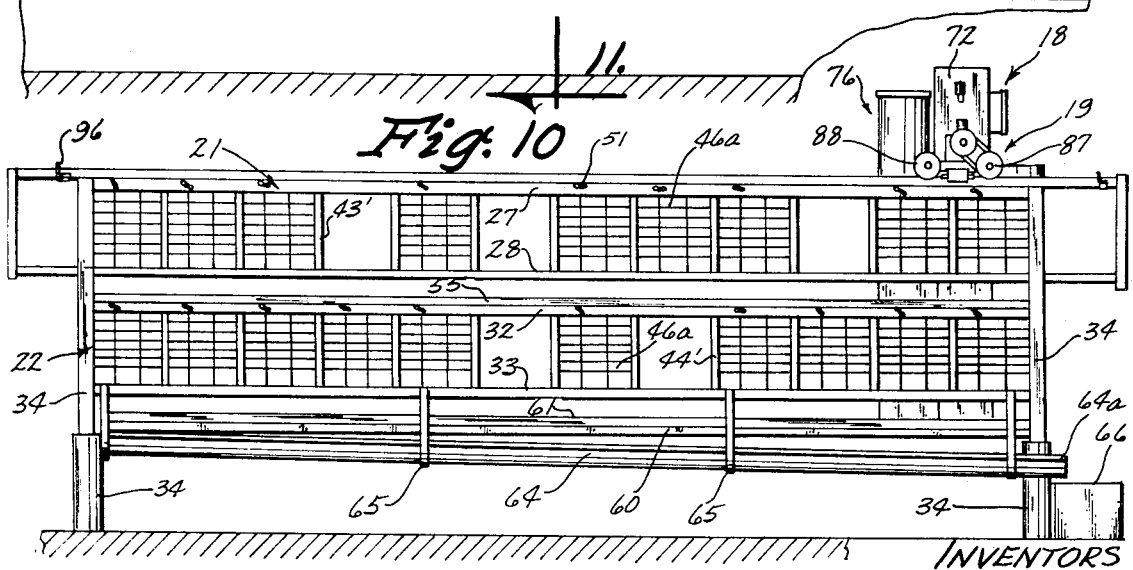
FIG. 13 is a rear elevational view of the cage assembly.

Forming the cage assembly 17 is an elongated angle iron 24 (FIG. 8) extending along the upper front edge of the upper row 21 of cages, another elongated angle iron 26 directly below angle iron 24 and extending along the front of the lower edge of the cages 21; and with a like pair of angle irons 27 and 28 (FIG. 13) forming the upper and lower rear edges of the cages 21. At the common ends of the angle irons 24, 26, 27 and 28 a pair of upper and lower end members 29 and 31 (FIG. 8) are secured therebetween to complete a box-like structure for the upper row of cages 21.

The lower row of cages 22 is formed in an identical manner as the upper row, with the front upper edge comprising an angle iron 32 (FIG. 8), with the lower edge thereof comprising an angle iron 33. Substantially identical angle irons 32 and 33 are also placed at the upper and lower rear edges of the lower row of cages 22, with the lower box-like structure completed by another pair of upper and lower end members 29 and 31 (FIG. 8).

The ends of the upper and lower rows of cages are interconnected and supported by a quartet of upright legs 34, each leg being placed at one of the four corners of the cage assembly 17. The rows 21 and 22 are vertically spaced for the disposition of excreta from the upper row 21 of cages.

A wire mesh material 36 (FIG. 1) is secured across the tops of all of the upper cages 21, with a smooth floor mesh material 37 (FIG. 1) secured across the bottom of the upper cages 21 to form a floor therefor. The lower row of cages 22 also has a mesh material 38 forming the top surface thereof, and a like mesh material 39 forming the floor surface thereof. By this arrangement, the cages of both rows are completely open for ventilation from above and below, with the floor mesh enabling manure to fall therethrough. Upright panels 41 and 42 (FIG. 8) enclose the ends of both the upper and lower batteries of cages, respectively, and interior upright panels 43 (FIG. 1) for the upper row and panels 44 for the lower row of cages divide each row into a plurality of cages of identical size. The panels 43 and 44 are solid and effectively isolate each cage from its adjacent cages.

At the front of each cage, an open framework 46 (FIG. 10) of horizontal and vertical rods is provided to enclose the front end, while at the rear of each cage another open framework 46a (FIG. 11) is mounted in an upstanding manner. The front frameworks 46 are removable, there being a pair of openings 47 (FIG. 11) formed in the upper portion of both the lower front edge angle irons 26 and 33, such that the lower ends 48 of the framework 46 can be inserted so as to extend through the openings 48. This enables a protruding horizontally turned end 49 (FIG. 11) of one of the vertical rods of the framework 46 to extend through an opening provided therefore in each of the upper angle irons 24 and 32 such that a wing nut 51 can be threaded thereon to fasten the framework 46 to the front of a respective cage. By merely removing each wing nut 51, a framework 46 can be quickly removed from the front of its cage.

As best illustrated in FIGS. 10 and 11, an open receptacle or cup 52 is detachably mounted on each framework 46, each cup having a pair of horizontally aligned openings 50 (FIG. 11) formed in the sides thereof such that the cup can be inserted onto a rod 53 of the framework 46, from one end thereof when the framework 46 is disassembled from a cage. Then when the framework is installed, the cup 52 can pivot about the rod 53 in a vertical plane, while being able to move slightly horizontal, guarded by adjacent vertical members. Each cup 52 is balanced such that its normal position is shown in full lines in FIG. 11, whereby an inner portion 54 of the cup is normally lowered resting on the floor 37 or 39 of a cage, but with each cup 52 pivotal so that an outer portion 56 can move from a normally raised condition to a lower condition, as shown by dotted lines in FIG. 11, whereby liquids therein may fall out of that cup end 56 due to gravity.

Beneath the upper row of cages 21, a flat pan 57 (FIG. 1) extends the entire length for the cage row 21 for receiving animal excreta, with the forward end 58 (FIG. 11) of the pan 57 bent down over an angle iron 59 secured above the angle iron 32 to raise the forward end of the pan 57. The rear lower end 55 (FIG. 13) of the pan rests on the angle iron 32 at the rear of the lower cage unit, such that excreta falling onto the pan 57 moves from the front of the cage assembly to the rear thereof due to gravity. Below the lower row of cages 22, another flat pan 61 (FIG. 1) is provided which also extends the entire length of the cage assembly 17, and with the forward portion 63 of the pan resting on an angle iron 62 (FIG. 11) extended between the front legs 34.

The forward portion 63 extends beneath the entire cage unit 18 such that no drippings therefrom go on to whatever floor the feeder apparatus 16 is resting upon.

The rear end of the pan 61 rests upon another angle iron 60 (FIG. 13) secured between the legs 34 at a position vertically lower than the angle iron 62 such that any drippings, excreta and the like move from the front portion thereof to the rear. A trough 64 (FIGS. 1 and 13) extending the entire length of the cage assembly 17 is mounted to the rear thereof by a plurality of straps 65 so as to catch all drippings and the like from the rear of the pans 57 and 61. The trough 64 is angularly mounted so that the material will flow downwardly due to gravity into a holding tank 66 mounted at the lower discharge end 64a of the trough 64.

A pair of water conduits 67 and 68 (FIG. 11) connected by conventional means to a source of water are mounted in the front of the cage assembly above each pan 57 and 61, respectively, and with each conduit 67 and 68 being provided with openings therein such that when water under pressure is applied to the conduits it is discharged in a spray downwardly and across the pans 57 and 61 toward the rear thereof so as to cleanse the pans in this manner. This structure is optional, as hand flushing and washing of the pans 57 and 61 can be readily accomplished.

Along the front upper edge of the cage assembly 17, an angle iron 69 (FIG. 1) is mounted for providing a track for the carriage unit 18 in a manner hereinafter described. The carriage unit 18 comprises an upright tank 72 (FIGS. 2 and 10) for holding water, a lower feed unit 73 (FIG. 10) mounted on top of a housing 74 to one side of the water tank 72, an upper feed unit 76 mounted on another housing 77 on the other side of the water tank 72, the housing 77 containing mechanism for the upper feed unit 76 and the flushing mechanism indicated generally at 78 in FIG. 11. The carriage unit 18 is maintained in a vertical condition relative to the cage assembly 17 on which it is movably mounted, by the driving mechanism 19, due to a rotatable spacer wheel 70 (FIG. 11) mounted for rotation about a vertical axis to a bracket 71, the latter being a part of the carriage unit 18.

Included in the driving mechanism 19, as best illustrated in FIGS. 2 and 11, is a drive motor 79 secured to a mounting 80 which is longitudinally adjustably mounted on an angle iron member 81 (See also FIG. 4), the latter being secured parallel to the extent of the cage unit 17 along the inner edge of a horizontally disposed plate 82 (FIGS. 2 and 11). A spring 83 is provided for maintaining the drive motor mounting 80 in a position such that proper tension is kept on a pulley belt 84 trained between a drive pulley 86 attached to a drive shaft 85 of the drive motor 79 and a drive wheel 87 having a U-shaped periphery frictionally embracing the upper edge of the track 69 in a manner to both drivingly connect the carriage unit 18 to the cage assembly 17 while suspending the carriage unit 18 on the cage assembly 17 for a smooth longitudinal, reciprocal movement relative thereto.

The driving mechanism 19 is completed by an idler wheel 88 (FIG. 3), both the drive wheel 87 and the idler wheel 88 being mounted in longitudinally spaced relation by axle bolts 89 and 91 to the member 81. For the purpose of reversing the drive motor 79 as explained hereinafter, when the carriage unit 18 reaches either end of the cage assembly 17, a pair of depressable stop switches 92 and 93 (FIG. 3) are mounted by means of a bracket 94 from the drive motor mounting 80 in oppositely extending directions. Each stop switch 92 and 93 is capable of engaging a stop member 96 (FIGS. 2 and 3) adjustably mounted in a stationary manner at each end of the track 69.

The water tank 72 (FIGS. 2 and 10) has a predetermined amount of water maintained therein by a conventional float mechanism 98 operable in conjunction with a float switch 99 for controlling the operation of a heating element 101 (FIG. 10) and for maintaining the water in the tank at a predetermined temperature. A thermostat 102 (FIG. 14) is provided for this purpose. Source water comes into the tank 72 through a conduit 103 (FIG. 1), and through a four way fitting 104 (FIG. 11) to a water inlet valve 106 for the tank 72, the inlet valve 106 being controlled by a pair of solenoid switches 107 and 108 (FIG. 14), the additional switch being supplied for purposes of safety such that when the heating element 101 is turned on, the tank 72 always has water therein.

The lower feed unit indicated generally at 73 in FIG. 10, comprises an ingredient canister 111 containing a supply of dried milk, for example, the canister being filled at the top which is covered by a cap 112, and with the dry feed therein being discharged by an auger 113 (See the auger 113' of upper feed canister 111', FIG. 11) at the base of the canister. The feed is discharged through an auger housing 116 (FIG. 8) into a circular funnel 117 mounted directly therebelow, which funnel has a semi-circularly smoothly formed interior bottom wall 118 (FIG. 4A).

Heated water is inserted into the open funnel 117 by means of a solenoid operated valve 119 (FIG. 8) attached to an inner side of the water tank 72, and with a conduit 121 leading therefrom to a discharge end 122 inserted into the funnel 117. By this arrangement, the dry feed and the heated water are swirreled together within the funnel 117 prior to passing through an outlet 123 therefor into a conventional blender housing 124 within which a whipper (not shown) of conventional construction is rotated by means of a motor 126. After the feed and water are thoroughly blended into a gruel, this is dispensed through a short conduit 127 directly into one of the cups 52 disposed directly below the conduit 127.

The lower feed unit housing 74 is best illustrated in FIGS. 1 and 8, and includes a box-like structure, the upper wall 128 of which is the floor for the canister 111, and the four walls of which encompass the blender motor 126 and the timing mechanism for the lower feed unit indicated generally at 129.

The upper feed unit indicated generally at 76 in FIGS. 2 and 11 is substantially identical to the lower feed unit 73, and therefore all like elements are identified by the same reference numerals as for the lower feed unit with the addition of a prime (') thereto. The timing mechanism 129' for the upper feed unit 76 is mounted on a horizontal panel 131 (FIG. 11) which divides the upper feed unit housing 77 into two sections, the lower section housing the flushing mechanism 78.

For the purposes of simultaneously flushing each cup 52 for cleansing purposes, the dispensing drinking water therein during every alternate pass of the carriage unit 18 lengthwise of the cage assembly 17, the flushing mechanism 78 is provided. This mechanism includes a motor 131 (FIG. 11) for rotating a shaft 132 to which is mounted in horizontally spaced relationship a pair of arms 133 and 134 for activating, respectively, a pair of switches 137 and 138 on a mounting 136 to which the motor 131 is also secured. Connected to the outer end of the shaft 132 is a strap 139 (FIGS. 11 and 12) to the upper end of which is pivotally connected a rod 140 which is pivotally connected a rod 140 which is pivotally connected at its other end to a link 142. A spring 141 embraces the rod 140 and aids in maintaining appropriate spacing between the strap 139 and the link 142.

The link 142 is pivoted at 143 (FIG. 12) to the wall 144 of the housing 77, with one end 146 thereof connected to a leaf 147 (FIG. 11) of a water control switch 148. The other end 149 of the link 142 is connected via a pin 151 extended through an elongated slot 152 to a vertically disposed bar 153. At the upper end of the bar 153 is an upper ring 154 adapted to engage the outer portion 56 of the cup 52 in the upper row of cages 21; and at the lower end of the bar 153 is a lower ring 156 adapted to engage the outer portion 56 of the cup 52 in each of the lower row of cages 22. The operation of this arrangement will be described more in detail hereinafter.

The flushing mechanism 78 includes further a valve 157, (FIG. 11) interconnected by a pipe 158 to the fitting 104, which valve 157 is opened and closed by a solenoid 159 for the purpose of permitting water under pressure to pass through a conduit 161 into a cup 52, of the upper row of cages 21, for flushing out the interior thereof, and for dispensing drinking water therein. Another valve 162 is connected by a pipe 163 to the fitting 104, and is controlled by solenoid 164 for opening and closing the valve 162 to a conduit 166 to the flow of flushing water therethrough for discharge out the lower end 167 into each cup 52 of the lower row of cages 22, again for flushing and cleansing purposes, and for dispensing drinking water into the cups 52.

To operate the feeder apparatus 16, assume the carrier unit 18 is at rest at one end of the cage assembly 17. The main switch 171 (FIG. 14) is closed such that current from source line 172 is passing through a 5 Amp fuse 173, and line 174 to one terminal of a clock timer 176 and thence to ground 177. As the stop switch 92 (FIG. 2) is depressed against a stop member 96, the switch 92 (FIG. 11) is in an open condition, whereby current in line 178 from the timer 176 is cut off. Current in line 179 from the timer to the other stop switch 93 (FIG. 11), however, passes therethrough across lines 181, 182 and 183 to the No terminals of a pair of double pole switches 184 and 186 for the upper and lower feed units 76 and 73, respectively.

The switches 184 and 186 (FIG. 6) are mounted in vertically spaced relation on an angle iron 187 beneath the member 81, with their depressible ends 188 and 189, respectively, extended toward the outer face of the upright leg 191 of the track 69. When not retracted, or not depressed, the double pole switches 184 and 186 are in the positions illustrated by full lines in FIG. 14.

Figure 14:
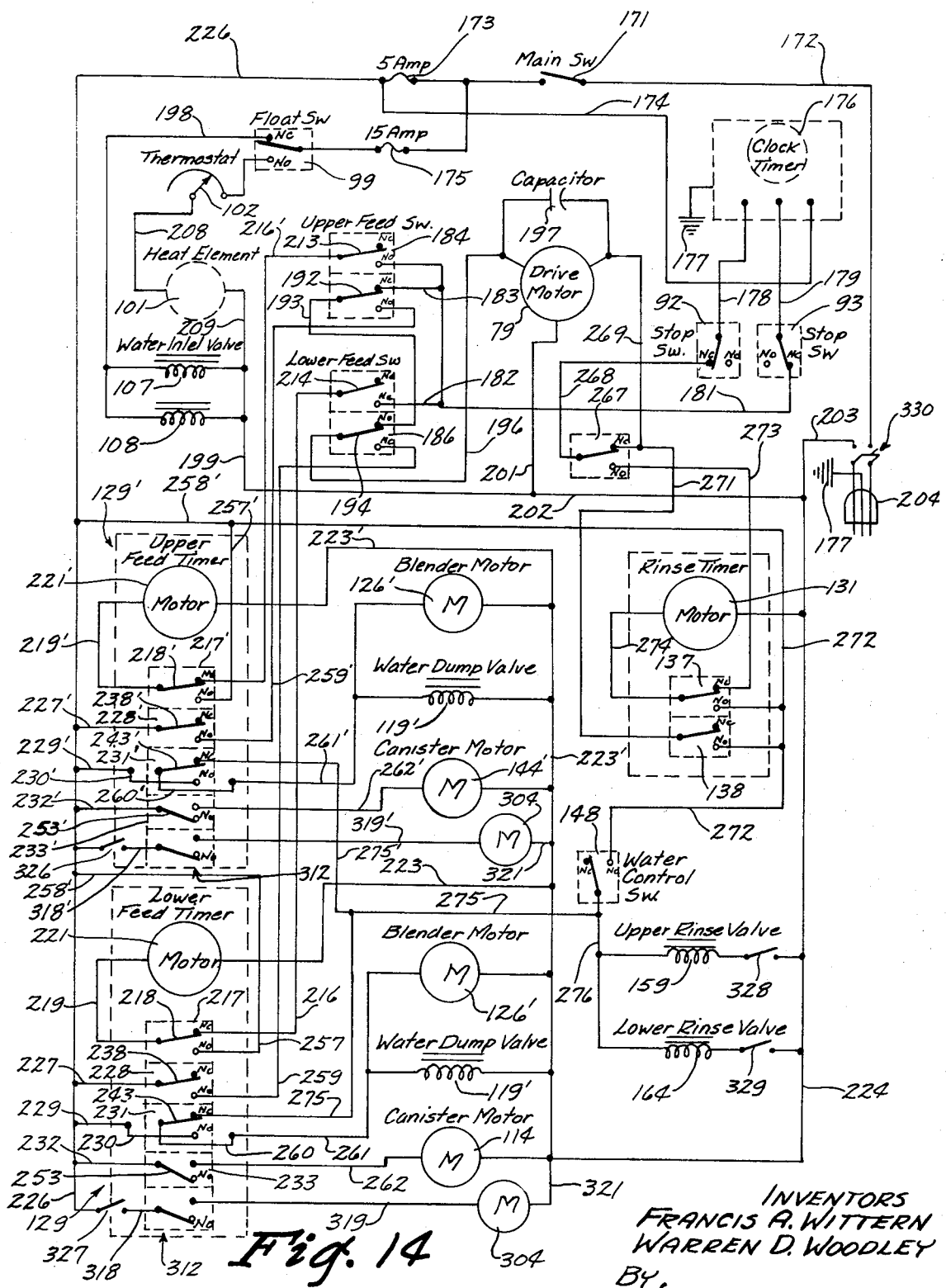
FIG. 14 is a schematic diagram of the electric circuitry for the apparatus.

With the current coming into switch 184 from the line 183, it passes across the Nc pole 192, through line 193 to the No pole 194, and through line 196 to one side of the drive motor 79, protected by a capacitor 197 as illustrated in FIG. 14. Thus drive is imparted by the motor 79 to the remainder of the driving mechanism 19 as described hereinbefore, such that the carriage unit 18 moves from right to left on the cage assembly 17 as viewed in FIGS. 1 and 10.

Current is also directed from line 172 through a 15 Amp fuse 175 to the float switch 99 on the water tank 72. If water is needed, the switch 99 is in the Nc position (FIG. 14) such the current passes through the line 198 to the solenoid switches 107 and 108 for opening the water inlet valve 106 (FIG. 11), the current then passing through lines 199 and 201 to the common side of the drive motor 79 (FIG. 14), the circuit being completed through lines 202 and 203 to the source plug 204. When the tank 72 is full, the switch 99 is changed to the No position, an overflow fitting 206 and conduit 207 (FIG. 2) being provided in case of switch failure, such that current is passed through the thermostat 102 and a line 208 to the heat coil 101, and thence via line 209 to line 199, the current then following the same path as before.

To activate the upper and lower feed units, a pair of cap screws 211 and 212 (FIG. 6) are secured through vertically spaced openings provided therefore in the track upright leg 191. The cap screws act to trip, and hereinafter are termed "trips," the switches 184 and 186 (FIGS. 6 and 14) whereby to change the position of the pole switches 213, 192 and 214, 194 respectively.

In the upper feed switch 184, current is cut off from pole 192, but passes across pole 213 in the No position, and through line 216' to the switch 217' (FIGS. 2, 9 and 11) of the timing mechanism 129' for the upper feed unit 76. Current passes across the Nc pole 218' and through line 219' to the upper feed timer motor 221', thereby rotating the motor shaft 222' (FIG. 11), and thence passes through lines 223' and 224 to line 203 to complete the circuit.

It will be noted that current from the main switch 171 and the fuse 173 also passes through line 226 (FIG. 14) to both the timing mechanism 129 for the lower feed unit 73 and the timing mechanism 129' for the upper feed unit 76. As the timing mechanisms for the units are also identical, only the upper mechanism 129' will be described, with like parts of the lower mechanism 129 indicated by like reference numerals sans the prime. Current from the line 226 passes by line 227' to a switch 228' for pulsing the drive motor 79, by lines 229' and 230' to a switch 231' for activating the water dump valve solenoid 119', and by line 232' to a switch 233' for activating the blender motor 126'.

Referring to FIG. 9, an exploded view of the timing mechanism 129' is shown, with a plurality of cams, spaced by washers 234', having squared central openings for receiving the shaft 222' of the timer motor 221'. The cam 235' for the timer motor switch 217' has a notch 236' formed therein, such that when the leaf 240' rests in the notch 236', the switch pole 218' is in the Nc position. Otherwise, the pole 218' is in the No position. The cam 237' for the drive motor pulsing switch 228' maintains the switch pole 238' in an Nc position except when the projection 239' engages the leaf 241' whereby the pole 238' changes to the No position.

The cam 242' for the switch 231' of the heated water solenoid 119' and the blender motor 126' retains the pole 243' for switch 231' in the Nc position until the projection 244' raises the switch leaf 246' to move the pole 243' to the No position. An extra cam 247' is provided which has a calibrated projection 248' for adding to the time the leaf 246' is raised to maintain the pole 243' in the No position. The cam 249' for the dry feed canister motor 114' has a notch 251' formed therein such that when the leaf 252' of the switch 233' is in the notch, the position of the switch pole 253' changes from a No position to a Nc position. An additional cam 254' is provided with a calibrated projection 256' for decreasing the length of the notch 251' whereby to reduce the period of activation of the canister motor 114'.

Referring again to FIG. 14, the Nc terminal of the run switch 217 is connected by line 216' to the left side of the upper feed switch 184; the No terminal being connected by lines 257' and 258' to the incoming line 226. The No terminal of the pulse switch 228' is connected by line 259' to the No terminal of the lower pole 192 for the switch 184. The No terminal for the water and blender switch 231' is connected through the pole 243' by lines 260' and 261' to both the blender motor 126' and the water valve solenoid 119' and thence to the common line 223'. The No terminal for the feed switch 233' is connected by line 262' to the canister motor 114' and then to the common line 223'.

With the upper feed motor 221' rotating, rotation of its shaft 222' (FIGS. 9 and 11) causes rotation of the cams 235', 237', 242', 247', 254', and 249'. This results in first the leaf 246' of the switch 231' changing its position such that the pole 243' moves to the No position whereby current is passed through lines 260' and 261' to the blender motor 126' and the water valve solenoid 119' such that water is dispensed through the line 121' (FIG. 8) into the funnel 117', with the blender 124' being operated. A second later, the leaf 252' of the feed switch 233' is changed such that the pole 253' of said switch changes to the Nc position to energize the canister motor 114' through line 262'. This results in dry feed being discharged from the canister housing 116' (FIG. 11) by action of the auger 113', the feed falling into the funnel 117' to be mixed with the water being discharged therein. As described hereinbefore, the mixture is then passed through the blender 124' prior to being discharged through the short conduit 127' into a cup 52 of the upper row of cages 21, which cup 52 is in its normal condition as illustrated in solid lines in FIG. 11.

Subsequent to the operation of the blender motor 126', water valve solenoid 119', and the canister motor 114', continued rotation of the shaft 222' (FIG. 9) results in the leafs 246' and 252' returning to their original position as illustrated in FIG. 9, whereby operation of the aforementioned elements ceases.

A like operation of the lower feed unit 73 is occuring due to the change of position of the poles 214 and 194 (FIG. 14) of the lower feed switch 186. By this arrangement, current is being supplied across the pole 214 of the lower switch 186 and through the line 216 to the Nc terminal of the switch 217, across the pole 218 and through the line 219 to the lower feed motor 221. This results in the timing mechanism 129 (FIG. 8) operating the lower feed unit 73 simultaneously with operation of the upper feed unit 76 to discharge the resulting gruel through the short conduit 127 (FIG. 11) into the lower cup 52 in front of one of the lower cages.

After the gruel has been dispensed by the upper feed timing mechanism 129', continued rotation of the cam 237' (FIG. 9) results in changing the position of the leaf 241' of the pulse switch 228' whereby the pole 238' changes to the No position such that current is sent through line 259', across pole 194 of switch 186, thence through line 196 to the drive motor 79. Thence current energizes the drive motor 79 sufficiently to rotate the driving mechanism 19 whereby to move the upper and lower feed switch 184 and 186 (FIG. 6) away from their trips 211 and 212. The feed switch plungers 188 and 189 therefore extend back to their normal position, returning the feed switches 184 and 186 to their positions as illustrated in solid lines in FIG. 14. Current through line 216' and 216 to the run switches 217' and 217, respectively, of the upper and lower feed motors is cut off.

These motors 221' and 221 continue to run for another instant, nevertheless, in order to place the timing cams in their exact same position as before, due to the leaf 240' for the upper run switch 217' running on the high side of the cam 235', the pole 218' thus remaining in its No position, receiving power through lines 258' and 257' from line 226 for an instant after the drive motor 79 is started, until the leaf 240' falls into the notch 236' (FIG. 9) changing thereby the pole 218' to its Nc position, thus shutting off the motor 221' as the circuit to the pole 218' in the Nc position is broken by the position of the upper feed switch 184. The exact operation of the lower feed timer mechanism 129 also occurs at the same time.

With the driving mechanism 19 again operating, the carriage unit 18 is moved until again one or both of the feed switches 184 and 186 are energized. In certain instances, it is desirable that the particular timing mechanism for the upper or lower feed unit be rendered inoperable. For example, referring to FIG. 10, it is seen that the upper cage 21e is empty, neither having an animal nor the front framework 46 therein. Although if the gruel were discharged at this point by the upper feed unit 76, it would of course fall downwardly onto the lower pan 61; by merely removing the trip 211 from the opening 263 provided therefor in the track 69, the upper feed unit 76 is rendered inoperative when the feed switches 184 and 186 reach the trip area. Thus, looking again at FIG. 10, as the lower feed switch 186 would be engaged by the trip 212 below the opening 263, thus rendering operative the lower feed unit 73, by leaving the upper switch 184 (FIG. 14) in its normal condition as illustrated in full lines therein, current is not passed to the upper feed motor 221' so as to begin operation of that unit 76. At the end of the operation of the lower feed unit 73, the action of the pulse switch 228 sending current through the line 259 and across the pole 194, and then through line 196 to the drive motor 79 again moves the driving mechanism 19 forward or to the left as viewed in FIG. 10, thus pulling the carriage unit 18 away from the single, lower trip 212.

Intermediate each pair of trips 211 and 212, or any combination thereof of upper and/or lower trips, is a trip 264 (FIGS. 7 and 10) for activating the flushing mechanism 78 (FIG. 11). As the carriage unit 18 moves from right to left on the cage assembly 17 as viewed in FIGS. 1 and 10, however, engagement of the flushing trip 264 by the depressable plunger 266 of a flush switch 267 (FIGS. 7 and 14) leaves the flushing mechanism 78 uneffected as the clock timer 176 (FIG. 14) is not directing current through the line 178 to the flushing stop switch 92.

When the carriage unit 18 has completed its movement along the entire front of the cage assembly 17 to the end opposite that from which it started (See FIG. 1), the stop switch 93 is held in an No position whereby current from the clock timer 176 through line 179 is cut off. After a predetermined period of time has passed, the clock timer 176 switches its transmission of current from the line 179 to the line 178. Thus, due to the switch 92 being in the Nc position, current is transmitted through line 268 to the switch 267. With this switch in the Nc position, current is passed through line 269 to the side of the drive motor 79 opposite the line 196, whereby the drive motor 79 is operated in a reverse direction of rotation. This causes the driving mechanism 19 to move the carriage unit 18 from left to right on the cage assembly 17 as viewed in FIGS. 1 and 10. Current is also passed through line 271 to the switch 138 (FIGS. 11 and 14). With that switch 138 in the Nc condition, the current is stopped at that point.

It will be noted that current is also directed from line 272, joining lines 258' and 226, to the water control switch 148. Again, that switch 148 is in the Nc condition, and does not pass current therethrough to the upper and lower rinse valve solenoids 159 and 164. Upon the carriage unit 18 reaching a flushing trip 264 (FIG. 7) such that the plunger 266 is depressed to change the condition of the switch 267, current is then passed through line 268, switch 267, and line 273 to the switch 137. With this switch in the Nc condition, current is passed through the switch 137 and line 274 to the motor 131, thus operating the flush or rinse timer mechanism 78.

With the rinse motor shaft 132 rotating, the strap 139 (FIG. 12) is also rotated so as to change, via the link 142, the condition of the water control switch 148. This does not occur, however, until the link 142 has caused the bar 153 to move downwardly such that the upper and lower rings 154 and 156 (FIG. 11) engage and move the upper and lower cups 52 from their drinking positions into their dotted line position of FIG. 11 for flushing purposes. At that time, as determined by the setting of the switch 148, that switch changes to its No condition such that current is passed therethrough and through line 276 to both solenoids 159 and 164 for the upper and lower valves 157 and 162, respectively, whereby water under pressure is discharged through the lines 161 and 166 into the lowered cups 52.

With the motor shaft 132 (FIG. 11) continuing to rotate, the link 142 effects subsequently an upward movement of the bar 153 so as to permit the cups 52 to move toward their normal condition as indicated in full lines in FIG. 11. Prior thereto, however, a certain amount of fluid is permitted to flow through the conduits 161 and 166 such that this water is inserted into the cups 52 during their returning to their normal positions, which water remains therein. Thus, subsequently to the flushing action of the flushing mechanism 78, drinking water is disposed into the cups 52.

Referring to FIG. 11, it will be seen that when the cups 52 are in their dotted line positions, with the outer portions 56 lowered, any and all feed material and water spilling out of the cups 52 falls downwardly and against a splash panel 276. At the bottom of the panel 276 an inwardly extended lip 277 is provided for insuring the material flush from the cups falling onto the bottom pan 61 for subsequent removal therefrom. Furthermore, when the carriage unit 18 is in front of the upper and lower cups 52 for feeding purposes, a backup plate 278 and 279 is provided, each plate being secured to a portion of the carriage unit 18, for preventing the respective cup 52 from being pushed into a dotted line position as illustrated in FIG. 11 by the energetic action of the animals eating therefrom. Referring to FIG. 11, a small pig P is shown in one of the lower cages 22 ready to eat from the cup 52 therein. The discharge ends of the flushing lines 161 and 166 are spaced away from the backup plate 278 and 279 such that during the flushing action, the cups 52 can be pivoted as illustrated.

If it should happen that a cup is held in its flush position by an animal, each backup plate 278 and 279 has opposite, tapered ends (FIG. 10) whereby as the carriage unit 18 approaches the cup it is gradually raised, forcing the animal away from the cup, until the latter is in its feed position. Should it be desirable, each ring 154 and 156 is detachable from its connection with the bar 153, whereby — if detached, movement of the bar 153 would not result in a pivoting of the cups 52 in either the upper or lower row of cages, as the case may be. Furthermore, the flushing operation for either or both rows of cages may be shut off by opening either or both switches 328 and 329 (FIG. 14). The switch 328 must be closed for the upper rinse valve solenoid 159 to operate, and the switch 329 must be closed for the lower rinse valve solenoid 164 to operate.

Referring again to switch 148 in FIG. 14, it will be noted that when that switch is closed, current passes not only through the line 276 to the rinse solenoids 159 and 164, but also through lines 275 and 275' to the Nc terminal of the switches 231 and 231', respectively. When the poles 243 and 243' are in the Nc condition, as is the case during the flushing movement of the carriage unit 18, current will thus flow across the poles and through the lines 260 and 261, and 260' and 261', to the respective blender motors and water dump valves.

Looking at the lower feed arrangement only, with the identical operation happening in the upper feed unit, this would result in the blender motor 126 operating the whipper in the blender housing 124 (FIG. 11), which would accomplish nothing as no dry milk would be discharged therein, but would however also result in the water dump valve 119 (FIG. 8) passing warm water through the conduit 121 to the funnel 117. This water would swirl about the funnel 117, drop into the blender housing 124, and then pass through the conduit 127 before it falls onto the pan 61 therebelow, thus flushing and cleansing particularly the feed transfer equipment at each stop during a cup flushing operation.

After the flushing operation of the flushing mechanism 78, continued rotation of the motor shaft 132 causes the arm 134 of the pulse switch 138 to change positions, such that with the switch 138 in the No position (FIG. 14) current is transmitted from lines 226, 258, and 272 across the switch 138 and through lines 271 and 269 to the right side, as viewed in FIG. 14, of the drive motor 79, thereby energizing the driving mechanism 19 to move the carriage unit 18 off the trip 264 (FIG. 10). The run switch 137 (FIG. 14), having been in the No position since initiation of the rinse timer operation, continues in that position for an instant after change of position of the switch 138, and then returns to the full line position of FIG. 14, whereby current through line 272 is cut off such that the motor 131 is rendered inoperative. Current to the motor through line 273 is also cut off due to the trip switch 267 returning to its Nc position.

When the next adjacent flushing trip 264' (FIG. 10) in the path of the carriage unit 18 is reached the plunger 266 (FIG. 7) is again depressed, beginning the flushing cycle all over again so as to flush the upper and lower cups 52 at that position. The carriage unit 18 continues its flushing path along the cage assembly 17 until it reaches the right end of the cage assembly 17 as viewed in FIG. 1, whereupon the flushing stop switch 92 is engaged by the respective stop 96, thus changing the switch 92 to an No position, whereupon current to the flushing mechanism 78 is cut off. The carriage unit 18 remains at that position until the clock timer 176 again switches current from the line 178 back to the line 179 at which time the feeding operation again begins. It will be noted that a main control switch 330 (FIG. 14) is provided in line with the source plug 204 for turning on or shutting down the entire electrical circuitry for the apparatus 16.

Thus with every two complete passes of the carriage unit 18 lengthwise of the cage assembly 17, all of the cups 52 receive a combination of dried milk and warm water, blended into a gruel, and are then flushed and cleansed by water under pressure being applied thereto, with the cups being tilted so that all of the flushing material may spill therefrom, and with clean water being left in the cups 52 for drinking purposes; and furthermore arrangements are made for automatic fluid cleansing of the feed transfer equipment, and for the automatic provision of dry feed in another set of cups 309 in all cages.

A modification of the apparatus is shown in FIGS. 15, 16, and 17 where all parts identical to the embodiment of FIGS. 1–13 are indicated by the same reference numerals.

Basically, the change involves the addition of a dry feed unit indicated generally at 300 and 301 for both the upper row of cages 21 and the lower row of cages 22. As each unit 300 and 301 is the same, only one — the lower unit 301, will be described. This unit 301 comprises a canister 302 (FIG. 15) mounted on a slightly enlarged housing 74' for holding a predetermined amount of dry meal or pellets suitable for animals of the weaning size.

The canister 302 has an auger 303 within its bottom area, driven by a motor 304, for discharging the dry feed outwardly through a spout 306 (FIG. 16) into a funnel portion 307 of a gravity flow tube 308 from whence the feed falls into a cup 309. The cup 309 is identical to the cup 52, and is placed alongside the cup 52 in each cage. The funnel 307 is affixed to the front of the housing 74 by a bracket 310 or the like.

To operate the motor 304 in timed relationship with the remainder of the apparatus (See FIG. 14), a fixed cam 311 is added to the other cams mounted on the shaft 222 (FIG. 17) of the lower mechanism 129 (See FIG. 8), and a normally open switch 312 is mounted alongside the other switches 233, 231, etc. As explained hereinbefore upon rotation of the shaft 222 in a clockwise direction, the cam 311 will also be rotated, whereupon the leaf 313 of the switch 312 will fall into the notch 314 of the cam, thereby changing the switch 312 to a closed condition.

Referring to FIG. 14, this provision would thus permit current from line 226 to be transmitted through a control switch 327, a line 318, the switch 312, and a line 319 to the motor 304 for operating same, thereby effecting the discharge of dry feed into each funnel 307. The current completes the circuit through line 321 to the common line 224. An adjustable cam 316 with a land 317 for filling in the notch 314 is provided adjacent the fixed cam 311 for varying the amount of time the switch 312 is held in the closed condition, such that the notch 314 may be made shorter and the feed lessened. By reversing the connections to the switch 312, the feeding time can of course be lengthened accordingly by the cam 316.

With the addition of these two dry feed units 300 and 301, not only may the animals receive warm milk and water, but also their diet may be supplemented for any predetermined period of time, depending upon the electrical hookup, by the addition of dry feed. According to tests with the modification, the addition of the dry feed to the diet may be made after the animals are approximately two weeks of age. This also accustoms the animals to eating dry feed before leaving this apparatus.

The provision of the control switches 326 and 327 (FIG. 14) for the dry feed units 300 and 301, respectively, enables the operator to add the dry feed operation to the apparatus at any time, or cut it out as the case may be. Furthermore, he can add to or cut out each level of cages 21 and 22.

We claim:
1. An automatic animal feeder comprising:
- a plurality of animal cages arranged side-by-side in horizontal alignment and forming thereby a cage assembly;
- a receptacle mounted at the front of each cage such that a rear portion thereof is disposed within said cage, and a front portion thereof is disposed in front of said cage;
- carriage means movably mounted on said cage assembly for horizontal movement along said cage assembly in front of said receptacles, and including a driving mechanism therefor;
- first means mounted on said carriage means capable of dispensing feed into each of said receptacles during movement of said carriage means in one direction along said cage assembly;
- second means mounted on said carriage means capable of dispensing water under pressure into each of said receptacles for flushing said receptacles during movement of said carriage means in an opposite direction along said cage assembly; and
- control means operatively associated with said cage assembly and said carriage means for synchronizing operation of said driving mechanism, said first means, and said second means.

2. An automatic animal feeder as described in claim 1, and further wherein each cage is separated by a solid partition.

3. An automatic animal feeder as defined in claim 1, and further wherein each cage includes an integral framework removably mounted at one end thereof.

4. An automatic animal feeder as described in claim 1, and further wherein said driving mechanism includes drive wheels mounted on a track secured to said cage assembly, and with a reversible motor provided for rotating said wheels.

5. An automatic animal feeder as described in claim 1, and further wherein said first means includes a canister for holding the feed and with an auger operated discharge at the base thereof, a funnel for receiving the feed from said discharge, a water line leading to said funnel, and an agitator device for blending said feed and water prior to dumping same into a receptacle directly therebelow when said first means is moved in front of a receptacle by said carriage means.

6. An automatic animal feeder as described in claim 1, and further wherein said second means includes a discharge tube leading from a source of water to a receptacle when said tube is moved in front of a receptacle by said carriage means, and including further a valve interposed between said tube and said source for controlling the passage of water through said discharge tube.

7. An automatic animal feeder as described in claim 1, and further wherein said control means comprises switch means on said carriage means and trip devices on said cage assembly operably connected to said driving mechanism, said first means, said second means for operation thereof in timed sequence and in response to activation by said trip devices.

8. An automatic animal feeder as described in claim 5, and further wherein said second means includes a discharge tube leading from a source of water to a receptacle when said tube is moved in front of a receptacle by said carriage means, and including further a valve interposed between said tube and said source for controlling the passage of water through said discharge tube.

9. An automatic animal feeder as described in claim 8, and further wherein said control means comprises switch means on said carriage means and trip devices on said cage assembly operably connected to said driving mechanism, said first means, and said second means for operation thereof in timed sequence and in response to activation by said trip devices.

10. An automatic animal feeder comprising:
a plurality of animal cages arranged side-by-side in horizontal alignment, forming thereby a cage assembly;
a cup-like receptacle pivotally mounted at the front of each cage with half the cup inside the cage and the other half of the cup outside to the front of the cage, whereby each receptacle is rockable from a normal position where an animal can eat from the inner portion to a position where the outer portion is lowered such that contents thereof tend to spill out of the receptacle due to gravity;
carriage means movably mounted on said cage assembly for horizontal movement along said cage assembly in front of said receptacles, and including a driving mechanism frictionally engaged with said cage assembly;
first means mounted on said carriage means capable of dispensing feed into each of said receptacles;
second means mounted on said carriage means capable of forcing liquid into each of said receptacles for cleansing purposes; and
control means operatively associated with said cage assembly and said carriage means for synchronizing operation of said driving mechanism, said first means, and said second means.

11. An automatic animal feeder as described in claim 10, and further wherein said second means includes a member movably mounted on said carriage means engageable with said receptacle to move said receptacle to a lower position, including a discharge tube for directing water into said lowered receptacle, and including further timing means operable to shut off the cleansing water and to disengage said member from said receptacle such that said receptacle returns to its normal position.

12. An automatic animal feeder as described in claim 10, and further wherein said control means comprises switch means on said carriage means and trip devices on said cage assembly operably connected to said driving mechanism, said first means, and said second means for operation thereof in timed sequence and in response to activation by said trip devices.

13. An automatic animal feeder as described in claim 11, and further wherein said control means comprises switch means on said carriage means and trip devices on said cage assembly operably connected to said driving mechanism, said first means, and said second means for operation thereof in timed sequence and in response to activation by said trip devices.

14. An automatic animal feeder comprising:
a plurality of animal cages arranged side-by-side in horizontal alignment and forming thereby a cage assembly;
a receptacle mounted at the front of each cage such that a rear portion thereof is disposed within said cage, and a front portion thereof is disposed in front of said cage;
carriage means movably mounted on said cage assembly for horizontal movement along said cage assembly in front of said receptacles, and including a driving mechanism therefor;
first means mounted on said carriage means capable of dispensing feed into each of said receptacles;
second means mounted on said carriage means capable of forcing liquid into each of said receptacles for cleansing purposes;
electric switch trip means mounted on said cage assembly and programmed to each cage; and
control means responsive to said trip means for operating said driving mechanism, said first means, and said second means, said control means including a reversible drive motor as a part of said driving mechanism, each side of which is connected in circuit with said driving mechanism, said first means, and said second means, and a timing mechanism capable of directing power alternately in timed sequence to one side of said drive motor for effecting movement of said carriage means in one direction, and then to the other side of said drive motor for effecting movement of said carriage means in the opposite direction.

15. An automatic animal feeder as described in claim 14, and further wherein said first means includes timing means responsive to activation of said trip means simultaneously with de-energization of said drive motor by said trip means; said timing means operable to activate said first means for a predetermined period of time, to re-energize said drive motor without affecting said trip means, and operable to de-energize itself.

16. An automatic animal feeder as described in claim 1, and wherein said first means includes a feed transfer unit and a water unit operable to discharge water into said feed transfer unit, said first means and said second means electrically connected, and said control means operable during movement of said carriage means in said opposite direction to effect discharge of water from said water unit into said feed transfer unit.

* * * * *